US012701525B2

(12) United States Patent
Guo et al.

(10) Patent No.:  US 12,701,525 B2
(45) Date of Patent:      Aug. 4, 2026

(54) TIMING ADJUSTMENT TECHNIQUES FOR UPLINK TRANSMISSION

(71) Applicant: ZTE Corporation, Shenzhen (CN)

(72) Inventors: Xiaolong Guo, Shenzhen (CN); Bo Gao, Shenzhen (CN); Yang Zhang, Shenzhen (CN); Ke Yao, Shenzhen (CN); Zhaohua Lu, Shenzhen (CN); Meng Mei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 265 days.

(21) Appl. No.: 18/587,757

(22) Filed: Feb. 26, 2024

(65) Prior Publication Data

US 2024/0205854 A1      Jun. 20, 2024

Related U.S. Application Data

(63) Continuation of application No. PCT/CN2022/121804, filed on Sep. 27, 2022.

(51) Int. Cl.
*H04W 56/00*          (2009.01)
*H04L 5/00*           (2006.01)

(52) U.S. Cl.
CPC ....... *H04W 56/0045* (2013.01); *H04L 5/0048* (2013.01)

(58) Field of Classification Search
CPC ......... H04W 56/0045; H04W 72/0446; H04W 72/231; H04W 72/53; H04L 5/0048; H04L 5/0051; H04L 5/0053
See application file for complete search history.

(56) References Cited

U.S. PATENT DOCUMENTS

2014/0226640 A1*  8/2014  Zhu ..................... H04L 5/0028
                                                      370/336
2015/0334669 A1*  11/2015  Zhang ................. H04L 27/2646
                                                      370/336
2015/0351134 A1*  12/2015  Kim ..................... H04L 5/001
                                                      370/336
(Continued)

FOREIGN PATENT DOCUMENTS

CN          103037498          4/2013
CN          106376075          2/2017
(Continued)

OTHER PUBLICATIONS

Extended European Search Report for co-pending EP Appl. No. 22 958 301.8, Report dated Nov. 27, 2024 10 pages.
(Continued)

*Primary Examiner* — Benjamin H Elliott, IV
(74) *Attorney, Agent, or Firm* — Perkins Coie LLP

(57) ABSTRACT

Techniques are described to perform uplink transmission. An example wireless communication method includes receiving, by a communication device, at least one reference signal in at least one wireless time unit and a timing advance adjustment message, where the timing advance adjustment message indicates a timing advance related information; and transmitting, in response to the receiving the at least one reference signal, an uplink transmission in a second wireless time unit, where a start time of the second wireless time unit is based on at least one timing value of the at least one wireless time unit and the timing advance related information.

20 Claims, 9 Drawing Sheets

(56) References Cited

U.S. PATENT DOCUMENTS

| | | | | |
|---|---|---|---|---|
| 2017/0245232 | A1* | 8/2017 | Kwon | H04W 56/0005 |
| 2017/0290001 | A1* | 10/2017 | Axmon | H04W 72/0446 |
| 2018/0084546 | A1* | 3/2018 | Guo | H04W 72/0446 |
| 2018/0124724 | A1* | 5/2018 | Tsai | H04W 56/00 |
| 2018/0131431 | A1* | 5/2018 | Dinan | H04L 1/1825 |
| 2018/0206262 | A1* | 7/2018 | Cao | H04W 56/0045 |
| 2019/0386929 | A1* | 12/2019 | Nakazawa | G06F 9/5083 |
| 2020/0100201 | A1* | 3/2020 | Farmanbar | H04W 56/0045 |
| 2021/0160805 | A1* | 5/2021 | Xu | H04W 56/0015 |
| 2021/0306994 | A1* | 9/2021 | Venugopal | H04W 72/23 |
| 2022/0078734 | A1* | 3/2022 | Zhang | H04W 74/006 |
| 2023/0048026 | A1* | 2/2023 | Huang | H04W 56/0045 |
| 2023/0189180 | A1* | 6/2023 | Yuan | H04W 56/0045 370/350 |
| 2023/0354229 | A1* | 11/2023 | Prasad | H04W 56/0015 |
| 2023/0397141 | A1* | 12/2023 | El Kolli | H04W 56/0045 |
| 2024/0205854 | A1* | 6/2024 | Guo | H04L 5/0048 |
| 2025/0063521 | A1* | 2/2025 | Guo | H04W 48/20 |
| 2025/0063522 | A1* | 2/2025 | Yuan | H04W 72/231 |
| 2025/0113318 | A1* | 4/2025 | Yuan | H04W 72/02 |

FOREIGN PATENT DOCUMENTS

| | | |
|---|---|---|
| JP | 2022-502879 | 1/2022 |
| WO | 2021/232304 | 11/2021 |

OTHER PUBLICATIONS

International Search Report and Written Opinion for PCT/CN2022/121804, filed Sep. 27, 2022, Report dated Apr. 21, 2023, 7 pages.

Vivo "Views on two TAs for multi-DCI-based multi-TRP operation" 3GPP TSG RAN WG1 #109-e R1-2203542, e-Meeting, May 9-20, 2022, 6 pages.

Vivo "Discussions on AI/ML for DMRS" 3GPP TSG RAN WG1 #109-e R1-2203556, e-Meeting, May 9-20, 2022, 10 pages.

CATT "Other aspects on AI/ML for beam management" 3GPP TSG RAN WG1 #110 R1-2206394 Toulouse, France, Aug. 22-26, 2022, 11 pages.

Vivo "Maintenance on UE features for DSS" 3GPP TSG-RAN WG1 Meeting #109-e R1-2203539 e-Meeting, May 9-May 20, 2022, 6 pages.

NEC "Remaining Issues on Group Scheduling Mechanisms for RRC_Connected UEs" 3GPP TSG RAN WG1 #108 R1-2201908, e-Meeting, Feb 21-Mar. 3, 2022, 3 pages.

ZTE "TA enhancement for multi-DCI" 3GPP TSG RAN WG1 Meeting #110 R1-2205919, Toulouse, France, Aug. 22-26, 2022, 12 pages.

CATT "Discussion on Two TAs for UL multi-DCI for multi-TRP operation" 3GPP TSG RAN WG1 #110 R1-2206376, Toulouse, France, Aug. 22-26, 2022, 9 pages.

LG Electronics "Two TAs for multi-TRP/panel" 3GPP TSG RAN WG1 #110 R1-2206867, Toulouse, France, Aug. 22-26, 2022, 9 pages.

Ericsson "Two TAs for multi-DCI" 3GPP TSG-RAN WG1 Meeting #110 Tdoc R1-2206247, Toulouse, France, Aug. 22-26, 2022, 6 pages.

First Examination Report for co-pending Australian Appl. No. 2022480348, Report dated Feb. 10, 2026, 3 pages.

Office Action for co-pending Japanese Appl. No. 2025-517562, Office action dated Feb. 2, 2026, 21 pages with global dossier translation.

Xiaomi "Discussion on two TAs for multi-TRP operation" 3GPP TSG RAN WGI #110, Toulouse, France, Aug. 22-26, 2022, R1-2206621, 6 pages.

Final Office Action for co-pending Japanese Appl. No. 2025-517562, Office action dated Jun. 5, 2026, 12 pages with Google translation.

* cited by examiner

Receiving, by a communication device, at least one reference signal in at least one wireless time unit and a timing advance adjustment message

804

Transmitting, in response to the receiving the at least one reference signal, an uplink transmission in a second wireless time unit

TIMING ADJUSTMENT TECHNIQUES FOR UPLINK TRANSMISSION

CROSS-REFERENCE TO RELATED APPLICATION

This application is a continuation and claims priority to International Application No. PCT/CN2022/121804, filed on Sep. 27, 2022, the disclosure of which is hereby incorporated by reference herein in its entirety.

TECHNICAL FIELD

This document is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for adjusting timing for uplink transmission.

A first example wireless communication method includes receiving, by a communication device, at least one reference signal in at least one wireless time unit and a timing advance adjustment message, where the timing advance adjustment message indicates a timing advance related information; and transmitting, in response to the receiving the at least one reference signal, an uplink transmission in a second wireless time unit, where a start time of the second wireless time unit is based on at least one timing value of the at least one wireless time unit and the timing advance related information.

In some embodiments, the start time of the second wireless time unit is obtained by advancing the second wireless time unit with a timing advance value indicated by the timing advance related information. In some embodiments, the timing advance adjustment message is associated with a transmission parameter that is same as that associated with the at least one reference signal. In some embodiments, the at least one timing value of the at least one wireless time unit is associated with the transmission parameter that is different from another transmission parameter of another timing value of another wireless time unit where the reference signal is received. In some embodiments, the transmission parameter comprises information grouping one or more reference signals, a reference signal resource set, a physical uplink control channel (PUCCH) resource set, panel related information, a sub-array, an antenna group, an antenna port group, a group of antenna ports, a beam group, a beam state, a candidate cell, a candidate cell list, a physical cell index (PCI), a time alignment group (TAG), TRP related information, a CORESET pool index, a set of power control parameters, an index of TCI state in a TCI state codepoint, a wireless communication device capability value, or a wireless communication device capability set.

In some embodiments, the at least one wireless time unit includes at least one wireless frame, and wherein the second wireless time unit includes a second wireless frame. In some embodiments, the method further comprises receiving information indicative of a plurality of time alignment groups (TAGs) or a plurality of TAG indexes and a plurality of transmission parameters, and where the plurality of TAGs or the plurality of TAG indexes are associated with the plurality of transmission parameters based on an order in which the plurality of TAGs or the plurality of TAG indexes are indicated in the information. In some embodiments, the method further comprises receiving information indicative of a plurality of time alignment groups (TAGs) or a plurality of TAG indexes and a plurality of transmission parameters, and where the plurality of TAGs or the plurality of TAG indexes are associated with the plurality of transmission parameters based on index values of the plurality of TAGs or the plurality of TAG indexes. In some embodiments, a transmission of the uplink transmission is scheduled or configured for the communication device, the transmission of the uplink transmission is not associated with a transmission parameter, and an association between the transmission of the uplink transmission and a default transmission parameter is based on a default rule or a message from a network device.

In some embodiments, the start time for the transmission of the uplink transmission is based on (1) the timing advance related information, (2) the at least one reference signal, and/or (3) the at least one timing value that is associated with the default transmission parameter. In some embodiments, the default transmission parameter indicated by the message from the network device or determined by the default rule comprises any one or more of: a lowest CORESETPoolIndex value, a highest CORESETPoolIndex value, a time alignment group (TAG) with a lowest TAG ID or a highest TAG ID, a transmission configuration indicator (TCI) state associated with the lowest TAG-ID or the highest TAG-ID, a transmit-receive point (TRP) related indication with a lowest value or a highest value, a pre-configured transmission parameter, and/or a specific physical cell ID (PCI). In some embodiments, the uplink transmission is associated with a first transmission parameter and a second uplink transmission is associated with a second transmission parameter in response to the uplink transmission and the second uplink transmission overlapping in time domain and/or frequency domain, where the uplink transmission and the second uplink transmission are scheduled or configured for transmission using the first transmission parameter, where the second transmission parameter is pre-configured or indicated by a network device, and where the first transmission parameter is different from the second transmission parameter.

In some embodiments, the first transmission parameter or the second transmission parameter comprises a sounding reference signal (SRS) resource set. In some embodiments, the uplink transmission and the second uplink transmission overlap in time domain in response to different timing advance values being applied to the uplink transmission and the second uplink transmission. In some embodiments, the method further comprises determining, by the communication device, not to transmit a second uplink transmission associated with a second timing advance value within a time gap. In some embodiments, the time gap starts from an end of the uplink transmission associated with the first timing advance value or starts from an end of a wireless frame associated with the first timing advance value. In some embodiments, the time gap is determined based on any one or more of a predetermined value set, a predetermined table, a predetermined default rule, or a message including at least one of a number of symbols, an index of the predetermined value set or an index of an entry in the predetermined table.

In some embodiments, the method further comprises performing, by the communication device, an operation in response to an expiration of a timer associated with a time alignment group (TAG). In some embodiments, the performing the operation includes canceling all uplink transmissions except physical random access channel (PRACH) associated with all TAGs and maintain timing advance values of all TAGs in response to the expiration of the timer associated with any of a plurality of primary TAGs (PTAGs). In some embodiments, the performing the operation includes canceling all uplink transmissions except physical random access channel (PRACH) associated with all TAGS and maintain timing advance values of all TAGs in response to the expiration of the timer associated with a TAG having a specific TAG index. In some embodiments, the specific TAG index is zero or a specific TAG index value associated with the TAG which contains SPCell. In some embodiments, the timer includes a time alignment timer (TAT). In some embodiments, the at least one reference signal includes at least one downlink reference signal.

A second example wireless communication method includes transmitting, by a network device, at least one reference signal in at least one wireless time unit and a timing advance adjustment message, where the timing advance adjustment message indicates a timing advance related information; and receiving, in response to the transmitting the at least one reference signal, an uplink transmission in a second wireless time unit, where a start time of the second wireless time unit is based on at least one timing value of the at least one wireless time unit and the timing advance related information.

In some embodiments, the second wireless time unit is advanced with a timing advance value indicated by the timing advance related information to obtain the start time of the second wireless time unit. In some embodiments, the timing advance adjustment message is associated with a transmission parameter that is same as that associated with the at least one reference signal. In some embodiments, the at least one timing value of the at least one wireless time unit is associated with the transmission parameter that is different from another transmission parameter of another timing value of another wireless time unit where the reference signal is received. In some embodiments, the transmission parameter comprises information grouping one or more reference signals, a reference signal resource set, a physical uplink control channel (PUCCH) resource set, panel related information, a sub-array, an antenna group, an antenna port group, a group of antenna ports, a beam group, a beam state, a candidate cell, a candidate cell list, a physical cell index (PCI), a time alignment group (TAG), TRP related information, a CORESET pool index, a set of power control parameters, an index of TCI state in a TCI state codepoint, a wireless communication device capability value, or a wireless communication device capability set.

In some embodiments, the at least one wireless time unit includes at least one wireless frame, and wherein the second wireless time unit includes a second wireless frame. In some embodiments, the method further comprises transmitting information indicative of a plurality of time alignment groups (TAGs) or a plurality of TAG indexes and a plurality of transmission parameters, and where the plurality of TAGs or the plurality of TAG indexes are associated with the plurality of transmission parameters based on an order in which the plurality of TAGs or the plurality of TAG indexes are indicated in the information. In some embodiments, the method further comprises transmitting information indicative of a plurality of time alignment groups (TAGs) or a plurality of TAG indexes and a plurality of transmission parameters, and where the plurality of TAGs or the plurality of TAG indexes are associated with the plurality of transmission parameters based on index values of the plurality of TAGs or the plurality of TAG indexes.

In some embodiments, a transmission of the uplink transmission is scheduled by the network device or configured for the communication device, the transmission of the uplink transmission is not associated with a transmission parameter, and an association between the transmission of the uplink transmission and the transmission parameter is based on a default rule or a message from the network device. In some embodiments, the start time for the transmission of the uplink transmission is based on (1) the timing advance related information, (2) the at least one reference signal, and/or (3) the at least one timing value that is associated with a default transmission parameter. In some embodiments, the default transmission parameter indicated by the message from the network device or determined by the default rule comprises any one or more of: a lowest CORESETPoolIndex value, a highest CORESETPoolIndex value, a time alignment group (TAG) with a lowest TAG ID or a highest TAG ID, a transmission configuration indicator (TCI) state associated with the lowest TAG-ID or the highest TAG-ID, a transmit-receive point (TRP) related indication with a lowest value or a highest value, a pre-configured value, and/or a specific physical cell ID (PCI).

In some embodiments, the method further comprises determining, by the network device, not to schedule a second uplink transmission associated with a second timing advance value within a time gap. In some embodiments, the time gap starts from an end of the uplink transmission associated with the first timing advance value or starts from an end of a wireless frame associated with the first timing advance value. In some embodiments, the time gap is determined based on any one or more of a predetermined value set, a predetermined table, a predetermined default rule, or a message including at least one of a number of symbols, an index of the predetermined value set or an index of an entry in the predetermined table. In some embodiments, the at least one reference signal includes at least one downlink reference signal.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 5 shows an example association between uplink transmissions and time alignment group (TAG).

DETAILED DESCRIPTION

Multiple Transmit-Receive Points (MTRP) transmission technology has been developed with progress, and multiple TRPs can be realized by multiple base stations or multiple antenna panels of one base station. Uplink time alignment technology can enable the arrival timing of transmissions from multiple user equipment (UEs) to be within an acceptable range and can allow for a reliable demodulation at network side. Uplink time alignment can require the UE to adjust transmission timing of an uplink transmission to be advanced from a reference downlink timing, where individual reference downlink timing for each TRP/Cell may be needed when one unified downlink reference timing cannot satisfy certain requirements.

The UE can receive a Timing Advance Command (TAC) corresponding to a Time Alignment Group (TAG) index, and the UE will determine uplink transmission timing of an uplink transmission associated with the TAG based on the received TAC. The association between different uplink transmissions and its corresponding TAG can be diverse due to scheduling schemes, configurations, etc.

With the development of UE, some UEs with higher capability have multiple panels and multiple RF links. Therefore, it may be possible for UE to transmit uplink transmissions through multiple panels at the same time. UE transmitting more than one uplink signals/channels at the same time through multiple panels can be referred to as simultaneous transmission across multiple panels (STxMP). When timing advance timeline is associated with TRP, two uplink transmissions associated with different TRPs might be overlapped in time domain due to different timing advance. In order to transmit both uplink transmissions rather than canceling one of them due to reduce the duration of a slot, the UE with the capability of STxMP can be allowed simultaneous transmission via multiple antenna panels.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Introduction

Downlink and uplink synchronization are necessary steps for ensuring reliable wireless communication in LTE and NR wireless system. The downlink synchronization is realized by receiving primary synchronization signal (PSS) and secondary synchronization signal (SSS), and the uplink synchronization is realized by random access procedure and uplink timing alignment maintenance.

Figure 1:
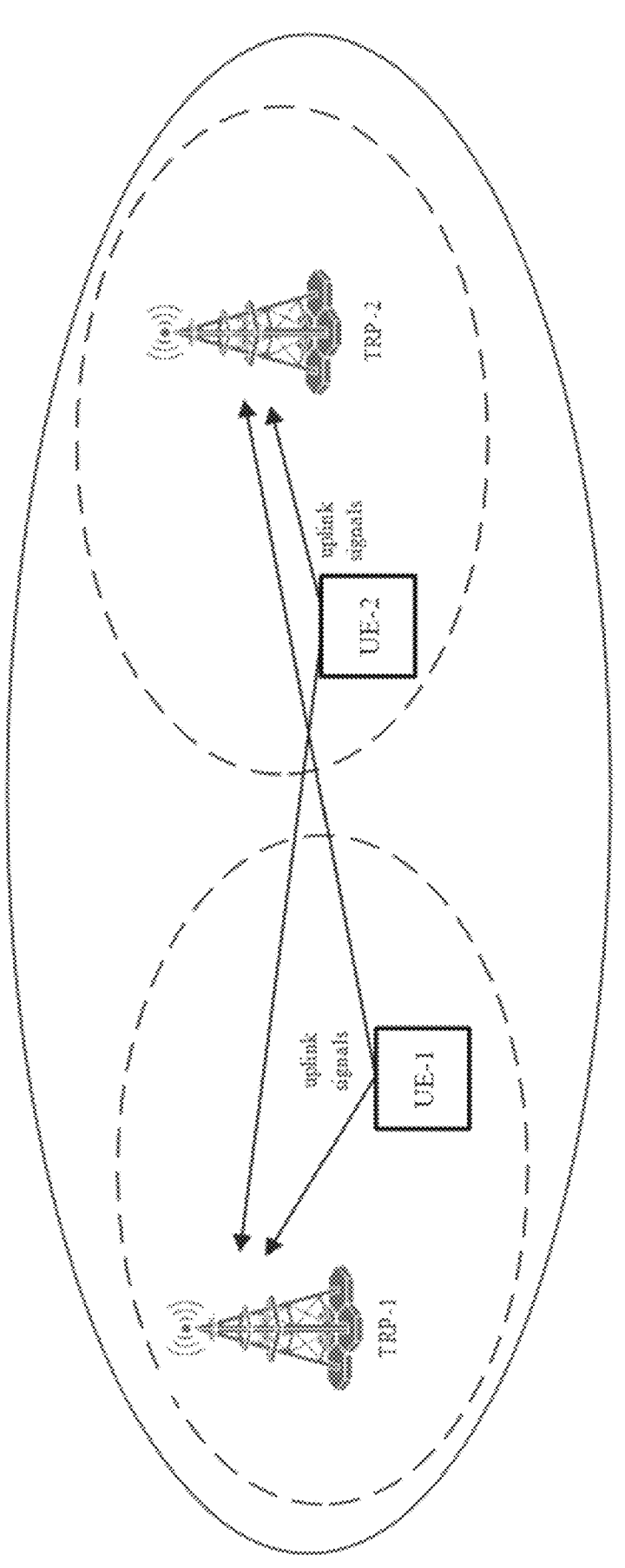
FIG. 1 shows an inter-cell or transmit-receipt point (TRP) uplink transmission from multiple user equipment (UEs).

FIG. 1 shows an inter-cell/TRP uplink transmission from multiple UEs. As shown in FIG. 1, different geographical locations of base stations or different physical directions of panels might result in different transmission delay for all uplink and downlink signals. Uplink synchronization is to ensure arrival time of uplink signals from diverse UEs can be in the range of cyclic preamble of the downlink sub-frame/slot/sub-slot, which can be seen that uplink signals from UEs are approximately aligned with each other.

The value of uplink transmission timing advance is related with $N_{TA,offset}$ determined by RRC signaling and Timing Advance Command (TAC) included in MAC CE. Normally, network configures multiple Time Alignment Groups (TAG) to indicate timing advance for multiple serving cells and each TAG includes one or more serving cells. Base station transmits a TAC associated with a TAG, and UE applies the TAC to determine timing advance for all serving cells in the TAG. For $N_{TA,offset}$, UE expects that the same value is configured for serving cells in the same TAG.

For m-TRP, UE can transmit signals to TRPs in a same serving cell and obtain the association between a TRP and a signal based on CORESETPoolIndex, PCI or other information. For Configured Grant based PUSCH transmission, periodic PUCCH transmission or Sounding Reference Signal transmission, UE transmits the corresponding signal based on the configured transmission information, e.g. time/frequency domain position and period, which means that the uplink signal is not associated with a DCI or a CORESET-PoolIndex. The association between a SRS/CG-PUSCH/P-PUCCH and a TRP can be only obtained by RRC messages, e.g. an associated TCI state, an associated reference signal or an explicit information element.

Figure 2:
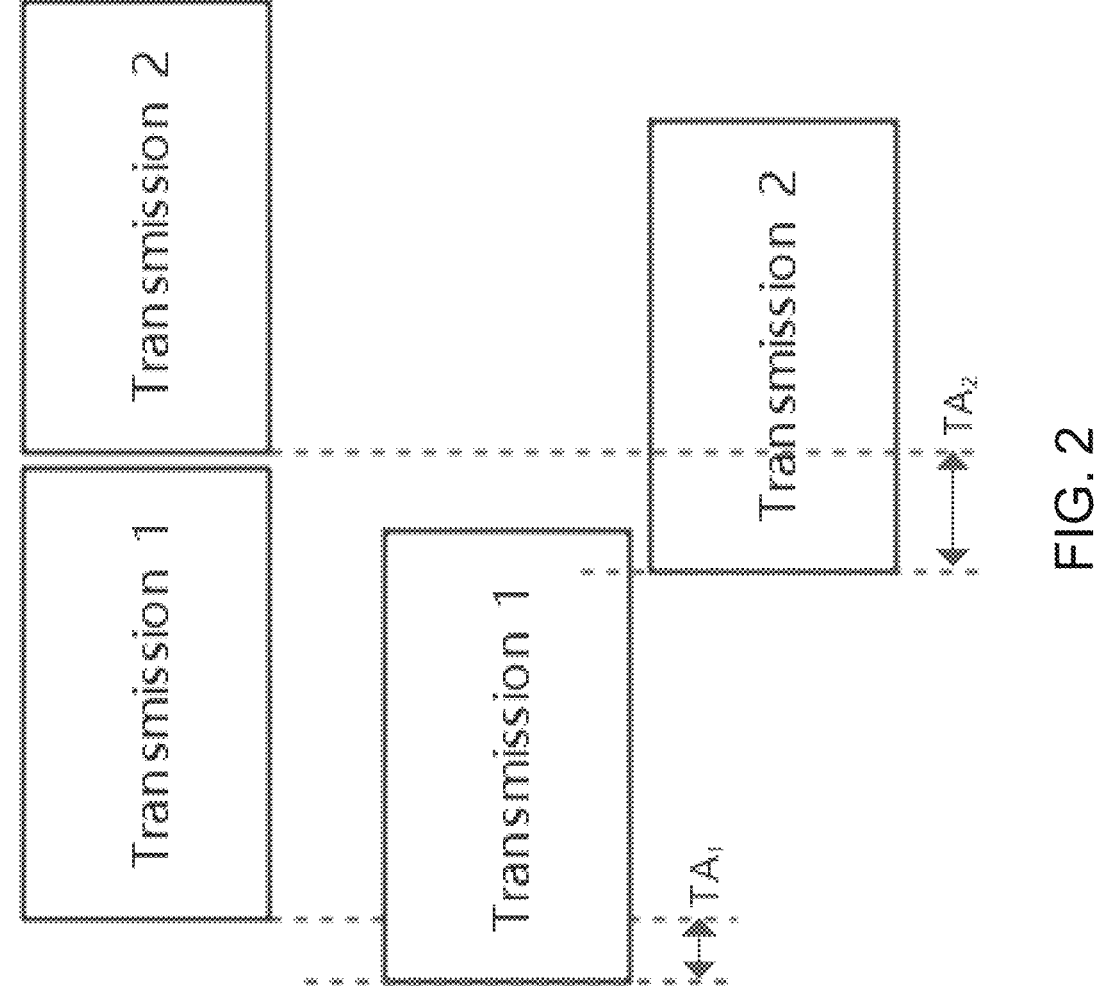
FIG. 2 shows adjacent frames overlapping due to applying different timing advance (TA).

When the UE receives two TAC and determines two uplink transmission timeline, two uplink transmissions which are scheduled non-overlapped might be transmitted overlapped in time domain by the UE. As shown in FIG. 2, two uplink transmissions are applied $TA_1$ and $TA_2$ respectively and are overlapped in time domain, simultaneous uplink transmission can be operated to avoid canceling one of the overlapped uplink transmissions. FIG. 2 shows adjacent frames overlapping due to applying different TA.

In this patent document, the term "transmission parameter" comprises any one or more of transmit-receive point (TRP), physical cell, base station or a set of panels of one base station. Furthermore, the TRP may comprises any one or more of "information grouping one or more reference signals", "resource set", "panel", "sub-array", "antenna group", "antenna port group", "group of antenna ports", "beam group", "physical cell index (PCI)", "TRP related indication index", "CORESET pool index", "candidate cell", "candidate cell list", "UE capability value" or "UE capability set".

In this patent document, the term "TRP indication" comprises any one or more of CORESET index, CORESET pool index, SS/PBCH block index, transmission configuration indicator (TCI) state index, PCI, RS set index, SRS resource set index, spatial relation index, power control parameter set index, panel index, beam group index, sub-array index, the index of CDM group of DMRS ports, the group index of CSI-RS resources, CMR set index, candidate cell index, or candidate cell list index.

In this patent document, the term "TCI state" comprises any one or more of TCI state for downlink, TCI state for uplink or TCI state for both uplink and downlink. In this patent document, the term "uplink signal" can be PUCCH, PUSCH, SRS or PRACH. In this patent document, the term "uplink transmission" can be a transmission occasion of an uplink signal, a repetition of an uplink signal, or an uplink signal. In this patent document, the term "downlink reference signal" can be pathloss RS, CSI RS or SSB. In this patent document, the term "slot" is equivalent to sub-slot, frame, sub-frame. In this patent document, the term "Uplink Control Information (UCI)" comprises HARQ-ACK information, SR, LRR or CSI. In this patent document, the term "Time Alignment Group (TAG)" may include one or more serving cells or one or more serving cells associated with at least one transmission parameter. In this patent document, timing advance adjustment message comprises any one or more of: a TAG index, a timing advance command, a reference timing advance command, a timing advance offset or a timing advance offset of a transmission parameter;

A number of approaches or techniques to adjust uplink transmission time are considered in the following example aspects:

Aspect (1): The UE receives at least one downlink reference signal and at least one timing advance adjustment message from the base station, the UE determines at least one downlink reference timing based on the receiving of the downlink reference signals, the UE determines the transmission timing of an uplink transmission to be advanced from a downlink reference timing,
where the advanced amount is determined based on the timing advance adjustment message;
where the timing advance adjustment message comprises any one or more of: a TAG index, a timing advance command, a reference timing advance command, a timing advance offset or a timing advance offset of a transmission information;
where the downlink reference signal comprises any one or more of: pathloss reference signal, CSI-reference signal or SSB;
where the transmission parameter comprises any one or more of: TRP, cell, TRP indication, TRP related information, cell related information, TAG, a TCI state indicated by a MAC CE, a TCI state indicated by a PDCCH, etc.;
where the uplink transmission comprises any one or more of a transmission occasion of an uplink signal, a repetition of an uplink signal, or an uplink signal, wherein the uplink signal comprises PUCCH, PUSCH, SRS or PRACH; and/or where the timing advance adjustment message, downlink reference signal, downlink reference timing are associated with a corresponding transmission parameter.

Details related to Aspect (1) are further described in Example Embodiment 1 in this patent document.

Aspect (2): The UE receives a information element comprising at least one Time Alignment Group index (TAG-ID), where the UE determines the association between a TAG index and a transmission parameter based on the position of the TAG-ID in the information element, the ascending/descending order of the TAG-ID, or explicit signaling in the information element.

Details related to Aspect (2) are further described in Example Embodiment 2 in this patent document.

Aspect (3): The UE is scheduled or configured an uplink transmission which is not associated with a transmission parameter,
where the UE determines transmission timing of the uplink transmission based on (a) the timing advance adjustment message, (b) downlink reference signal, and/or (c) downlink reference timing associated with a default transmission parameter, and/or
wherein the default transmission parameter comprises any one or more of: the lowest/highest CORESET-PoolIndex value, TAG with the lowest/highest TAG-ID, a TCI state associated with the lowest/highest TAG-ID, the TRP indication with the lowest/highest value, pre-configured transmission parameter, or a specific transmission parameter.

Details related to Aspect (3) are further described in Example Embodiment 3 in this patent document.

Aspect (4): The UE is scheduled or configured a first and a second transmission associated with a first transmission parameter,
where the UE determines transmission timing of the first and second transmission based on the corresponding timing advance adjustment message and then the two transmissions are overlapped in time domain,
where the UE determines to transmit the first transmission associated with the first transmission parameter,
where the association between the first transmission and the first transmission parameter can be configured or scheduled,
where the UE determines to transmit the second transmission associated with a second transmission parameter, and/or
wherein the second transmission parameter is pre-configured or indicated by the base station.

Details related to Aspect (4) are further described in Example Embodiment 4 in this patent document.

Aspect (5): The UE is configured at least one TAGs, and is configured at least one Time Alignment Timer (TAT) for each of the TAGs,
where the UE determines to cancel uplink transmissions associated with at least the corresponding TAG when a TAT expires,
where the UE determines to cancel uplink transmissions associated with all configured TAGs when a TAT associated with a specific TAG expires,
where canceling uplink transmissions comprises flushing HARQ buffers, releasing configured PUCCH/SRS, clearing configured downlink assignments, clearing configured uplink grants or clearing PUSCH resource for semi-persistent CSI reporting.

Details related to Aspect (5) are further described in Example Embodiment 5 in this patent document.

II. Example Embodiment 1

Example embodiment 1 describes techniques to determine at least one downlink reference timing (e.g., one or more start times of one or more downlink frames) associated with the corresponding transmission parameter based on received downlink reference signals (e.g., in one or more downlink frames) and determine uplink transmission timing of an uplink transmission using one of the at least one downlink reference timing.

In some embodiments, a timing advance adjustment message is associated with at least one TCI state, one TCI state group or one TCI state pool and at least one downlink reference signal is associated with the TCI state, TCI state group or TCI state pool.

In some embodiments, a timing advance adjustment message and at least one downlink reference signal are associated with a same transmission parameter. In some embodiments, each downlink reference timing is associated with a different transmission parameter. In some embodiments, a transmission parameter may include a TRP related information or a cell related information.

Figure 3:
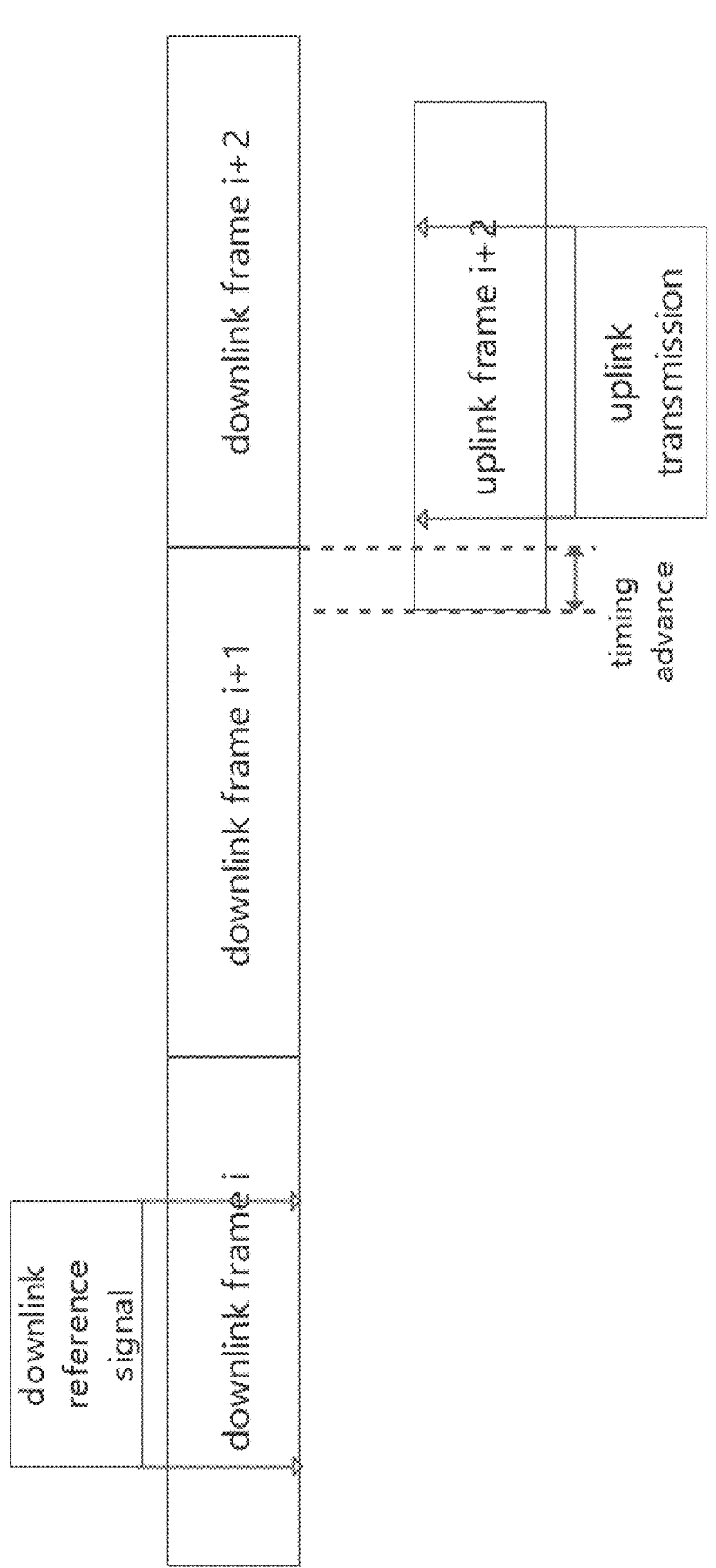
FIG. 3 shows an example of downlink and uplink timing determination.

In some embodiments, the UE receives a downlink reference signal and determines the corresponding downlink timing, and the UE further determines the downlink timing of a downlink frame (e.g., start time of downlink frame i in FIG. 3). The UE determines transmission timing of an uplink transmission (e.g., start time of uplink frame i+2 in FIG. 3) based on the downlink timing of the downlink frame and the timing advance adjustment message.

In an example, an uplink transmission associated with a downlink reference signal is to be transmitted in an uplink frame, and the UE determines the transmission timing of the uplink frame to be advanced from the downlink frame timing by an amount determined by the corresponding timing advance adjustment message.

In an example, the uplink transmission is indicated/configured to use the downlink reference signal as pathloss RS. In another example, the QCL type information of the uplink transmission and the downlink reference signal is Type A or Type C. In another example, the uplink transmission is indicated/configured a spatial relation information associated with the downlink reference signal.

In some embodiment, the UE receives a downlink reference signal and determines the corresponding downlink timing. The UE determines transmission timing of an uplink transmission based on the downlink timing, the timing advance adjustment message, and a plurality of time domain transmission parameters.

In an example, the time domain transmission parameters comprises start symbol and length indication, system frame number, SCS or slot index.

FIG. 3 shows an example of downlink and uplink timing determination. In an example shown in FIG. 3, the UE receives a downlink reference signal and determines the corresponding downlink timing of one or more downlink frames. The UE further determines uplink transmission timing of the uplink transmission which is associated with the downlink reference signal, wherein the timing advance amount is determined based on the corresponding timing advance adjustment message.

Figure 4:
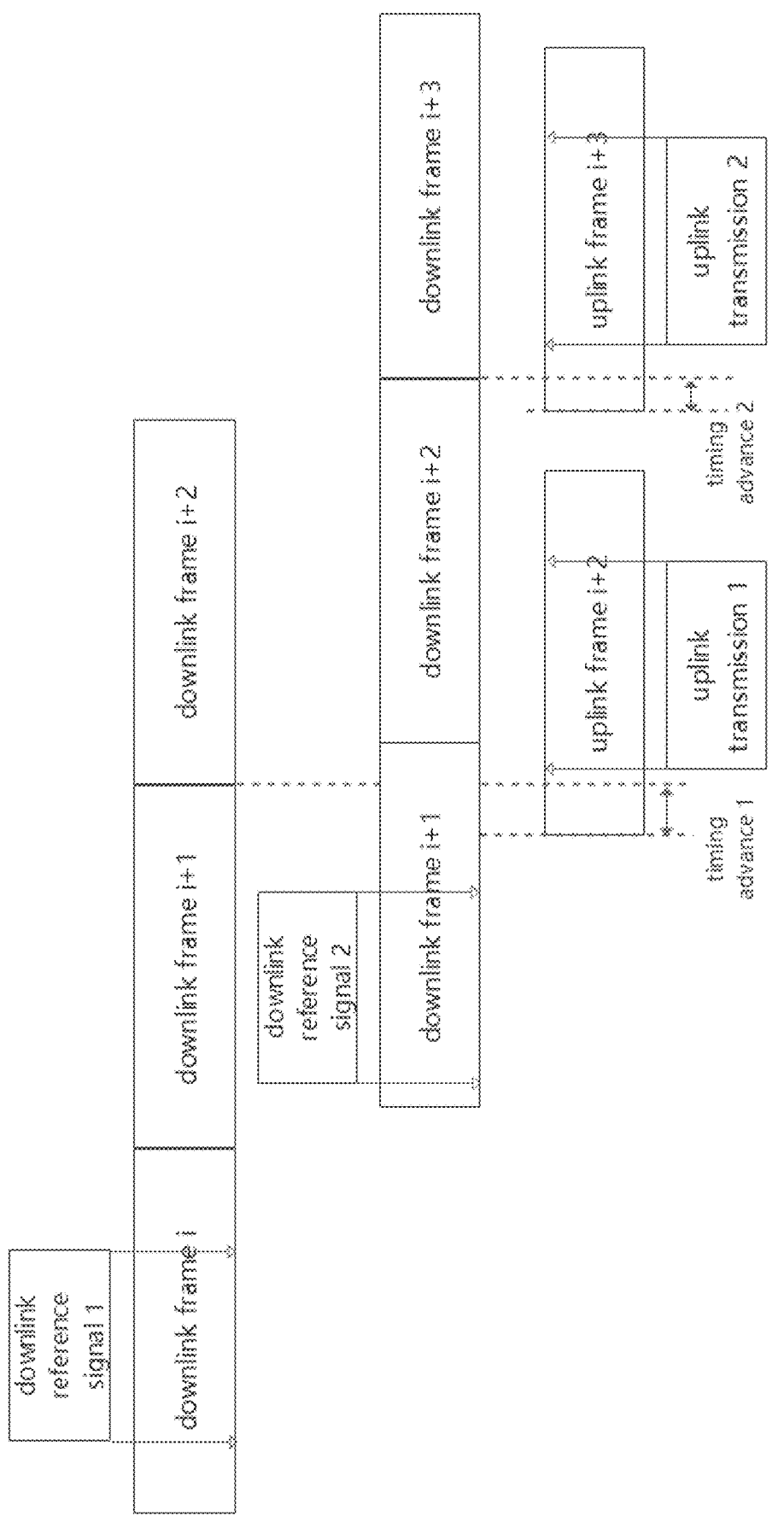
FIG. 4 shows an example of two downlink and uplink timing determinations.

FIG. 4 shows an example of two downlink and uplink timing determinations. In an example shown in FIG. 4, the UE receives a first downlink reference signal and determines the corresponding downlink timing of one or more downlink frames, and further receives a second downlink reference signal and determines the corresponding downlink timing of one or more downlink frames. The UE further determines uplink transmission timing of an uplink transmission based on the corresponding timing advance adjustment message and the timing of downlink frame(s) determined by the associated downlink reference signal.

III. Example Embodiment 2

Example embodiment 2 describes techniques to determine association between a TAG index and a transmission parameter.

In some embodiments, the UE is configured with more than one TAGs or TAG indexes for a serving cell in an information element received by the UE.

In an example, the UE associates the first TAG/TAG index with a first transmission parameter and associates the second TAG/TAG index with a second transmission parameter.

In an example, the UE associates the TAG having lower TAG index value with a first transmission parameter and associates the TAG having higher TAG index value with a second transmission parameter.

In an example, the UE associates a TAG/TAG index with a transmission parameter according to explicit indication/configuration in the information element. For example, a field described as TAG-Id is associated with a first transmission parameter and a field described as TAG-Id-additional is associated with a second transmission parameter.

In examples above, the first transmission information can be CORESETPoolIndex value 0, physical cell index configured in ServingCellConfigCommon, or reference signal group index associated CORESETPoolIndex value 0, and the second transmission information can be CORESETPoolIndex value 1, additional physical cell index, or reference signal group index associated CORESETPoolIndex value 1.

In some embodiments, the UE is configured more than one TAGs associated with at least one serving cell configurations.

In some embodiments, TAGs associated with the SPCell have the lowest TAG indexes among all the configured TAGs. In an example, only one TAG is associated with the SPCell, and its TAG index is 0. In an example, two TAGs are associated with the SPCell, and the TAG indexes are 0 and 1 respectively.

In some embodiments, TAG index of one of the TAGs associated with the SPCell is 0.

In some embodiments, TAG index of a TAG associated with a specific transmission parameter is 0, wherein the specific transmission parameter comprises CORESETPoolIndex value 0, TCI state associated with CORESETPoolIndex value 0 or downlink reference signal group associated with CORESETPoolIndex 0.

In some embodiments, TAG with TAG index 0 is a Primary TAG (PTAG).

In some embodiments, TAGs associated with the SPCell are PTAGs.

In this embodiment, the UE determines transmission timing of an uplink transmission associated with a transmission parameter based on a timing advance adjustment message associated with the corresponding TAG/TAG index.

IV. Example Embodiment 3

Example embodiment 3 describes techniques to determine association between a TAG index and an uplink transmission which is not associated with a transmission parameter based on a default rule or a message from network.

In some embodiments, an uplink transmission is not associated with a transmission parameter or is commonly associated with more than one transmission parameters.

In an example, for an uplink transmission resource set configured commonly without association with a specific transmission parameter, the UE determines to associate the uplink transmission resource set with a default TAG/TAG index.

In an example, for an uplink transmission configured to be transmitted periodically and not associated with a specific transmission parameter, the UE determines to associate the uplink transmission with a default TAG/TAG index.

In examples above, the default TAG/TAG index is the TAG/TAG index which is associated with a specific CORE-SETPoolIndex value, physical cell index configured in Serv-ingCellConfigCommon, reference signal group index associated a specific transmission parameter, or TCI state associated with a specific transmission parameter.

In some embodiments, a TCI state indication MAC CE is used to indicate the UE at least one TCI state indexes to be associated with at least one uplink transmissions.

In an example, the TCI state indication MAC CE consists of any one or more of the following fields: serving cell index, PCI, DL BWP index, UL BWP index, TCI state index, or TCI state type indication. The TCI state type can be downlink TCI state, uplink TCI state or joint TCI state.

In an example, the UE receives the TCI state indication MAC CE and determines the association between an uplink transmission and the indicated TCI state(s).

In an example, the at least one uplink transmissions are not associated with a TCI state which is further associated with a TAG/TAG index before the reception of the TCI state indication MAC CE.

Figure 5:
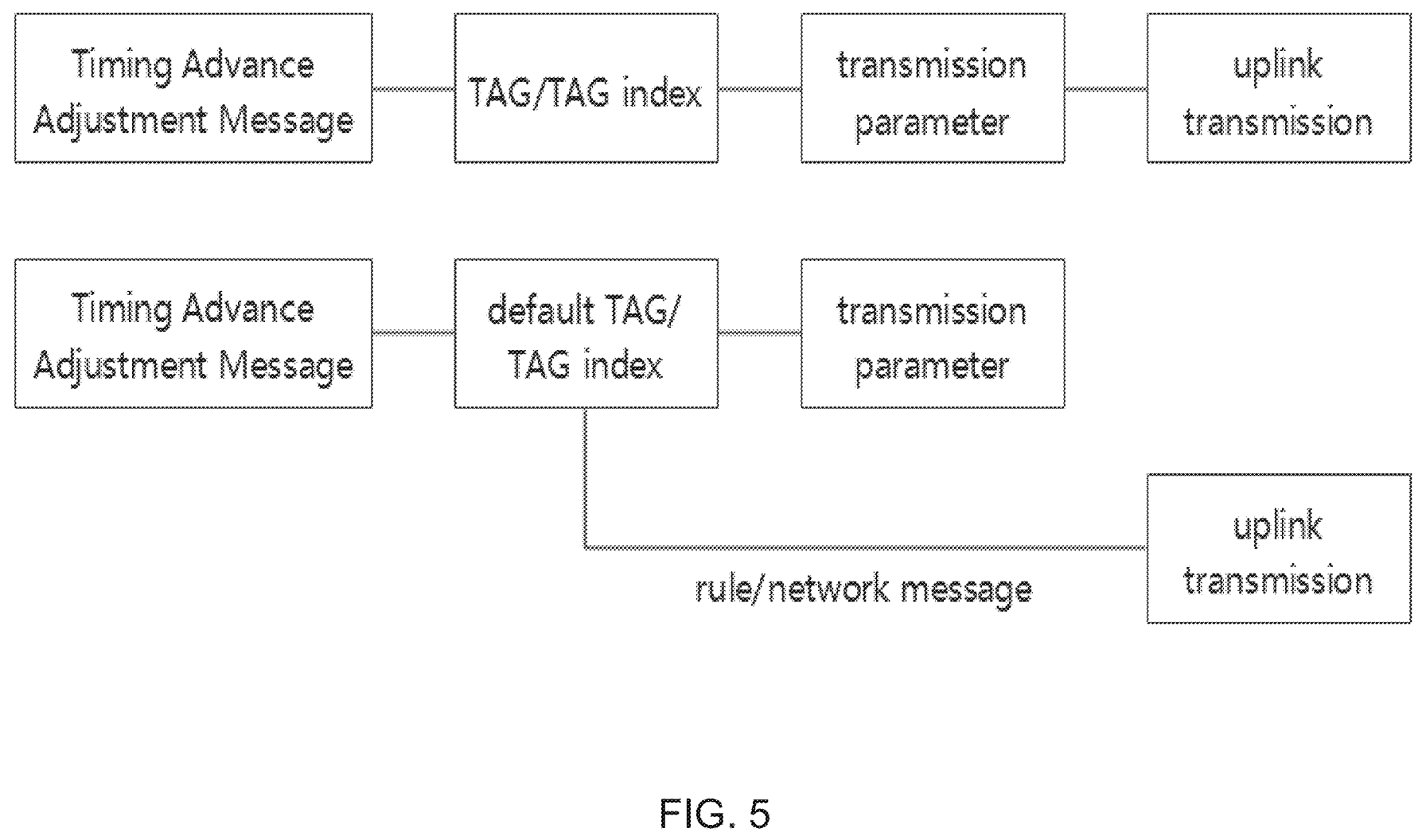

FIG. 5 shows an example association between uplink transmissions and TAG. In an example shown in FIG. 5, for most uplink transmissions, the UE can determine the association between the uplink transmission and the TAG based on its configured or indicated transmission parameter. For some uplink transmissions which are not associated with a transmission parameter to indicate the UE the association, the UE can determine the association based on a rule (e.g. a pre-configured default TAG) or a network message (e.g. specific TCI state indication MAC CE).

V. Example Embodiment 4

Example embodiment 4 describes a technique to address the overlapping issue in case of applying different timing advance values in the way of simultaneous uplink transmission operation.

In embodiments below, the UE has the capability of simultaneous uplink transmission, and the operation has been enabled, allowed or indicated if any.

In some embodiments, the UE transmits more than one uplink transmissions simultaneously via multiple panel related information comprising antenna port groups, antenna panels, antenna panel groups, beam groups or TCI states.

In some embodiments, the UE is scheduled or configured a first and a second uplink transmission, and the two uplink transmissions are overlapped in time domain due to applying different timing advance adjustment values.

In an example, the two uplink transmissions are associated with different panel related information. The UE transmits each of the two uplink transmissions based on the corresponding panel related information and does not reduce transmission duration of any of the uplink transmissions or does not cancel any of the uplink transmissions.

In an example, the two uplink transmissions are associated with the same panel related information. The UE transmits the first uplink transmission based on the associated panel related information and transmits the second uplink transmission based on a panel related information configured/indicated by the network. The UE does not reduce transmission duration of any of the uplink transmissions or does not cancel any of the uplink transmissions.

In an example, the network configures/indicates at least one panel related information to be used in case of simultaneous uplink transmission operation. When the indication or configuration is present, the UE can transmit an uplink transmission based on the indicated/configured panel related information rather than the associated panel related information. When the indication or configuration is absent, the UE transmits an uplink transmission based on the associated panel related information.

In an example, the UE determines to cancel the first or the second uplink transmission and reports a message to inform the base station that simultaneous uplink transmission is required.

In an example, the UE determines to reduce transmission duration of the first or the second uplink transmission and reports a message to inform the base station that simultaneous uplink transmission is required.

In an example, after sending the reporting message carrying simultaneous uplink transmission requirement, the UE can be indicated/enabled/configured to transmit the two uplink transmissions based on different panel related information.

In examples above, the reduced transmission duration at least equal to the length of the overlapped parts of the two uplink transmissions.

In some embodiments, the UE does not expect to transmit an uplink transmission associated with a first timing advance adjustment value within a time gap starting from the end of an uplink transmission associated with a second timing advance adjustment value.

In some embodiments, the UE does not expect to transmit an uplink transmission associated with a first timing advance adjustment value within a time gap starting from the end of an uplink frame associated with a second timing advance adjustment value.

In some embodiments, the time gap is determined based on a predetermined value set (containing a plurality of time gap values), a predetermined table, a predetermined default rule (e.g. some predetermined time gap values to be used in specific conditions), or a message including at least one of a number of symbols, an index of the predetermined value set or an index of an entry in the predetermined table.

In some embodiments, the UE ignores the time gap when simultaneous uplink transmission is enabled/allowed/indicated. In such embodiments, the UE can perform the first and second uplink transmissions without having a time gap in between the two transmissions.

In some embodiments, UE is enabled/allowed/indicated simultaneous uplink transmission. For uplink transmissions associated with different TAs but the same transmission parameter (e.g., SRS resource set), the time gap above should be kept. For uplink transmissions associated with different transmission parameters (e.g., SRS resource sets), the time gap can be ignored.

VI. Example Embodiment 5

Example embodiment 5 describes techniques to specify UE's behavior when the Time Alignment Timer (TAT) associated with a TAG expires.

In some embodiments, the TAT associated with a TAG will start or restart when a timing advance adjustment message associated with the TAG is received by the UE. The TAT expiration is equivalent to the gap between the current timing and the reception timing of the last timing advance adjustment message is beyond the TAT.

In some embodiments, canceling the uplink transmissions upon expiration of the TAT timer comprises flushing HARQ buffers, releasing configured PUCCH/SRS, clearing configured downlink assignments, clearing configured uplink grants or clearing PUSCH resource for semi-persistent CSI reporting.

In some embodiments, when the TAT associated with the only PTAG expires, the UE cancels all the uplink transmissions associated with all TAGS and maintain timing advance adjustment values of all TAGS.

In some embodiments, when the TAT associated with any of the PTAGs expires, the UE cancels all the uplink transmissions associated with all TAGs and maintain timing advance values of all TAGs.

In some embodiments, when the TAT associated with the PTAG having a specific TAG index expires, the UE cancels all the uplink transmissions associated with all TAGS and maintains timing advance values of all TAGS.

In some embodiments, when the TAT associated with the PTAG not having a specific TAG index expires, the UE cancels all the uplink transmissions associated with this TAG and maintains timing advance values of this TAG.

In some embodiments, when the TAT associated with the PTAG not having a specific TAG index expires, the UE cancels all the uplink transmissions associated with this TAG and maintains timing advance values of this TAG.

In some embodiments, when the TAT associated with the STAG having a specific TAG index expires, the UE cancels all the uplink transmissions associated with all TAGS and maintains timing advance values of all TAGS.

In some embodiments, when the TAT associated with any of the STAGs expires, the UE cancels all the uplink transmissions associated with this TAG and maintains timing advance values of this TAG.

In embodiments above, the specific TAG index can be TAG index value 0 or the TAG index value associated with the TAG which contains SPCell.

In some embodiments, when the TAT associate with a TAG expires and the TAG contains at least one serving cell which is configured more than one TAGs, and at least one TAT associated with these TAGs does not expire, the UE determines uplink transmission timing associated with this TAG based on timing advance adjustment messages associated with the one of TAGs whose TAT does not expire and maintains timing advance values of this TAG.

In embodiments above, maintaining timing advance values comprises determining uplink transmission timing based on the received timing advance adjustment messages.

This patent document describes example techniques to adjust transmission timing of uplink signals/channels when multiple downlink/uplink timing are applied by. Thus, example techniques are described for describing downlink/uplink timing according to the reception of downlink reference signals and the association between the uplink transmission and the downlink reference signal; for describing association between a TAG index and an uplink transmission; and for describing simultaneous uplink transmission operation in case of overlapping between uplink transmissions.

Figure 6:
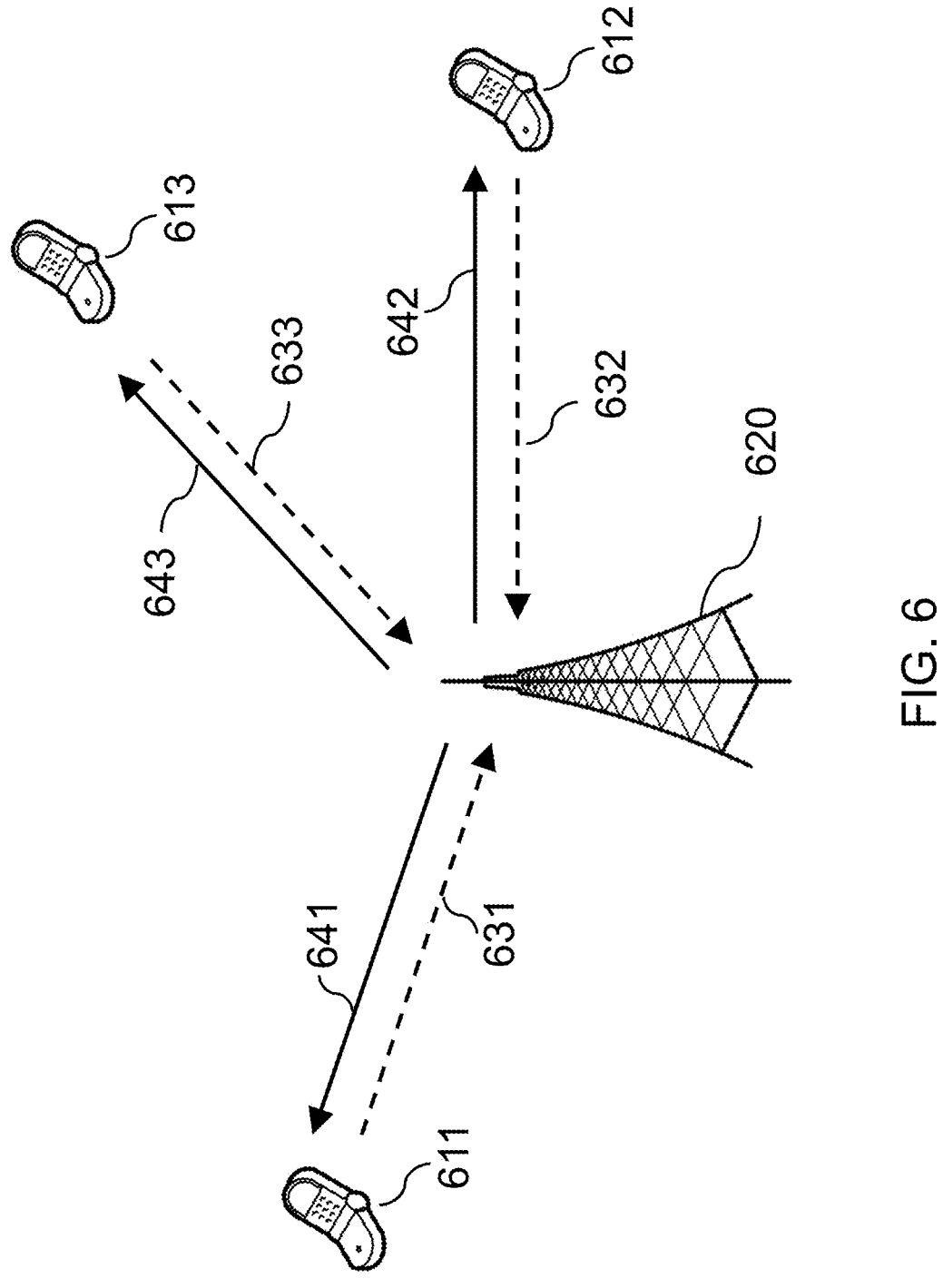
FIG. 6 shows an example of wireless communication including a base station (BS) and user equipment (UE) based on some implementations of the disclosed technology.

The implementations as discussed above will apply to a wireless communication. FIG. 6 shows an example of a wireless communication system (e.g., a 5G or NR cellular network) that includes a base station 620 and one or more user equipment (UE) 611, 612 and 613. In some embodiments, the UEs access the BS (e.g., the network) using a communication link to the network (sometimes called uplink direction, as depicted by dashed arrows 631, 632, 633), which then enables subsequent communication (e.g., shown in the direction from the network to the UEs, sometimes called downlink direction, shown by arrows 641, 642, 643)

from the BS to the UEs. In some embodiments, the BS send information to the UEs (sometimes called downlink direction, as depicted by arrows 641, 642, 643), which then enables subsequent communication (e.g., shown in the direction from the UEs to the BS, sometimes called uplink direction, shown by dashed arrows 631, 632, 633) from the UEs to the BS. The UE may be, for example, a smartphone, a tablet, a mobile computer, a machine to machine (M2M) device, an Internet of Things (IoT) device, and so on.

Figure 7:
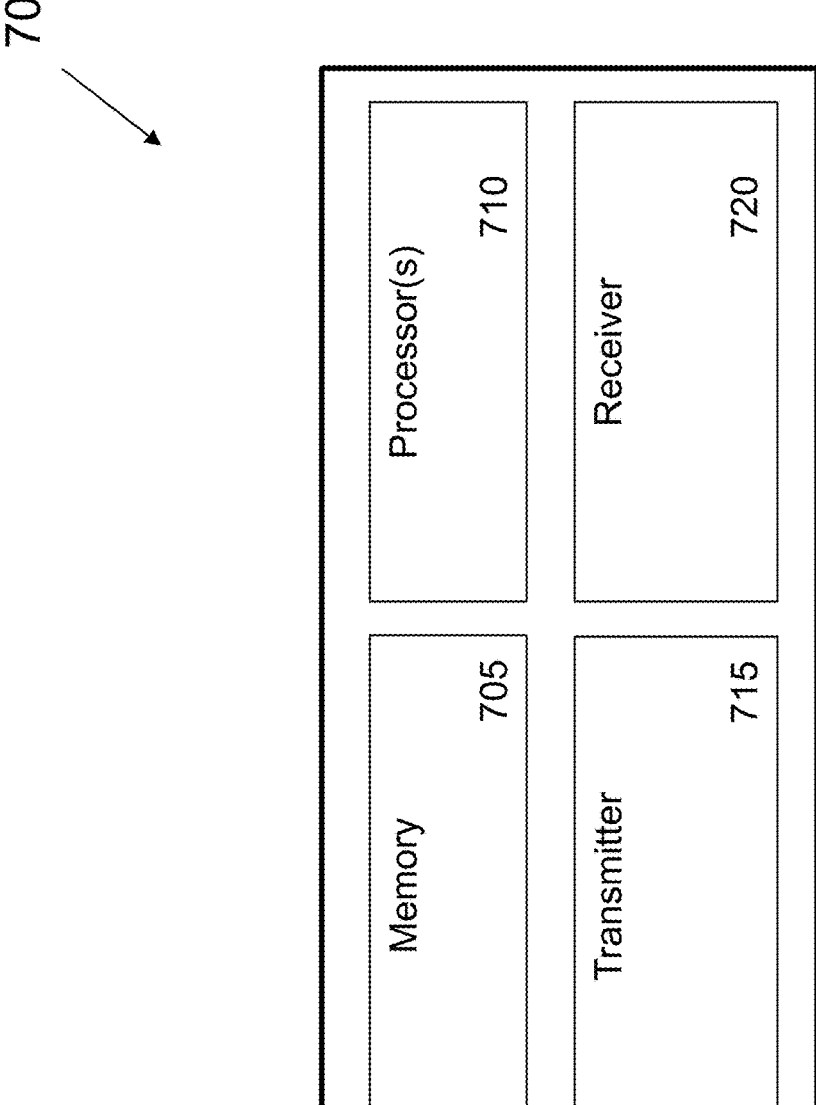
FIG. 7 shows an exemplary block diagram of a hardware platform that may be a part of a network device or a communication device.

FIG. 7 shows an exemplary block diagram of a hardware platform 700 that may be a part of a network device (e.g., base station) or a communication device (e.g., a user equipment (UE)). The hardware platform 700 includes at least one processor 710 and a memory 705 having instructions stored thereupon. The instructions upon execution by the processor 710 configure the hardware platform 500 to perform the operations described in FIGS. 1 to 6 and 8 to 9, and in the various embodiments described in this patent document. The transmitter 715 transmits or sends information or data to another device. For example, a network device transmitter can send a message to a user equipment. The receiver 720 receives information or data transmitted or sent by another device. For example, a user equipment can receive a message from a network device.

Figure 8:
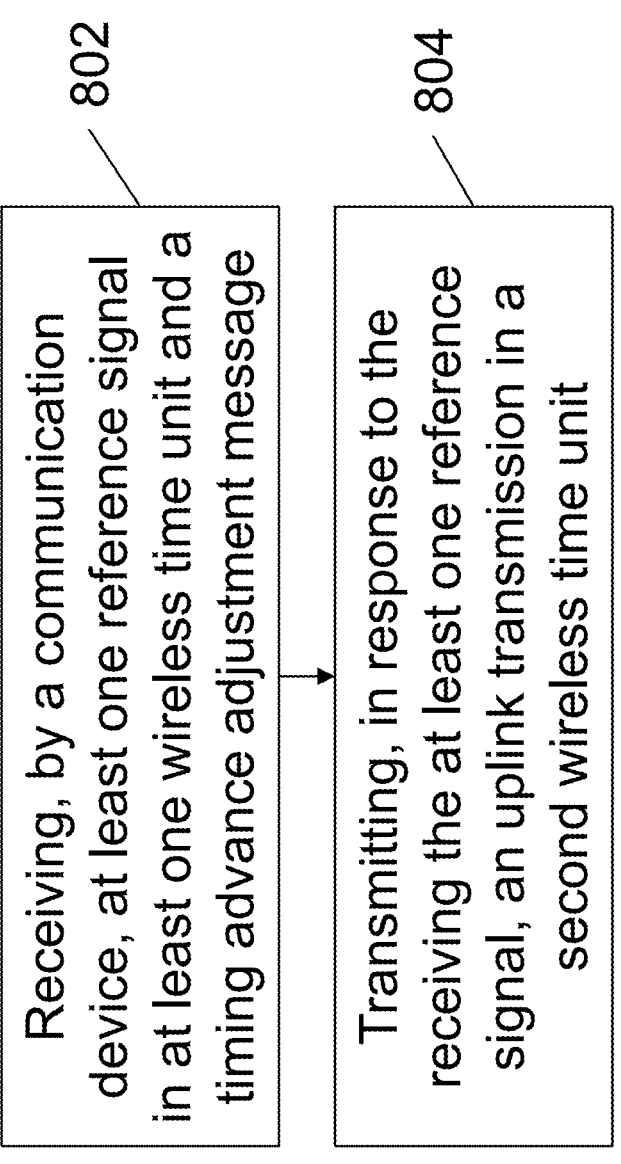
FIG. 8 shows an exemplary flowchart for transmitting an uplink transmission.

FIG. 8 shows an exemplary flowchart for transmitting an uplink transmission. Operation 802 includes receiving, by a communication device, at least one reference signal in at least one wireless time unit and a timing advance adjustment message, where the timing advance adjustment message indicates a timing advance related information. Operation 902 includes transmitting, in response to the receiving the at least one reference signal, an uplink transmission in a second wireless time unit, where a start time of the second wireless time unit is based on at least one timing value of the at least one wireless time unit and the timing advance related information.

In some embodiments, the start time of the second wireless time unit is obtained by advancing the second wireless time unit with a timing advance value indicated by the timing advance related information. In some embodiments, the timing advance adjustment message is associated with a transmission parameter that is same as that associated with the at least one reference signal. In some embodiments, the at least one timing value of the at least one wireless time unit is associated with the transmission parameter that is different from another transmission parameter of another timing value of another wireless time unit where the reference signal is received. In some embodiments, the transmission parameter comprises information grouping one or more reference signals, a reference signal resource set, a physical uplink control channel (PUCCH) resource set, panel related information, a sub-array, an antenna group, an antenna port group, a group of antenna ports, a beam group, a beam state, a candidate cell, a candidate cell list, a physical cell index (PCI), a time alignment group (TAG), TRP related information, a CORESET pool index, a set of power control parameters, an index of TCI state in a TCI state codepoint, a wireless communication device capability value, or a wireless communication device capability set.

In some embodiments, the at least one wireless time unit includes at least one wireless frame, and wherein the second wireless time unit includes a second wireless frame. In some embodiments, the method further comprises receiving information indicative of a plurality of time alignment groups (TAGs) or a plurality of TAG indexes and a plurality of transmission parameters, and where the plurality of TAGs or the plurality of TAG indexes are associated with the plurality of transmission parameters based on an order in which the plurality of TAGs or the plurality of TAG indexes are indicated in the information. In some embodiments, the method further comprises receiving information indicative of a plurality of time alignment groups (TAGs) or a plurality of TAG indexes and a plurality of transmission parameters, and where the plurality of TAGs or the plurality of TAG indexes are associated with the plurality of transmission parameters based on index values of the plurality of TAGs or the plurality of TAG indexes. In some embodiments, a transmission of the uplink transmission is scheduled or configured for the communication device, the transmission of the uplink transmission is not associated with a transmission parameter, and an association between the transmission of the uplink transmission and a default transmission parameter is based on a default rule or a message from a network device.

In some embodiments, the start time for the transmission of the uplink transmission is based on (1) the timing advance related information, (2) the at least one reference signal, and/or (3) the at least one timing value that is associated with the default transmission parameter. In some embodiments, the default transmission parameter indicated by the message from the network device or determined by the default rule comprises any one or more of: a lowest CORESETPoolIndex value, a highest CORESETPoolIndex value, a time alignment group (TAG) with a lowest TAG ID or a highest TAG ID, a transmission configuration indicator (TCI) state associated with the lowest TAG-ID or the highest TAG-ID, a transmit-receive point (TRP) related indication with a lowest value or a highest value, a pre-configured transmission parameter, and/or a specific physical cell ID (PCI). In some embodiments, the uplink transmission is associated with a first transmission parameter and a second uplink transmission is associated with a second transmission parameter in response to the uplink transmission and the second uplink transmission overlapping in time domain and/or frequency domain, where the uplink transmission and the second uplink transmission are scheduled or configured for transmission using the first transmission parameter, where the second transmission parameter is pre-configured or indicated by a network device, and where the first transmission parameter is different from the second transmission parameter.

In some embodiments, the first transmission parameter or the second transmission parameter comprises a sounding reference signal (SRS) resource set. In some embodiments, the uplink transmission and the second uplink transmission overlap in time domain in response to different timing advance values being applied to the uplink transmission and the second uplink transmission. In some embodiments, the method further comprises determining, by the communication device, not to transmit a second uplink transmission associated with a second timing advance value within a time gap. In some embodiments, the time gap starts from an end of the uplink transmission associated with the first timing advance value or starts from an end of a wireless frame associated with the first timing advance value. In some embodiments, the time gap is determined based on any one or more of a predetermined value set, a predetermined table, a predetermined default rule, or a message including at least one of a number of symbols, an index of the predetermined value set or an index of an entry in the predetermined table. In some embodiments, the method further comprises performing, by the communication device, an operation in response to an expiration of a timer associated with a time alignment group (TAG). In some embodiments, the performing the operation includes canceling all uplink transmissions except physical random access channel (PRACH) associated with all TAGS and maintain timing advance values of all TAGs in response to the expiration of the timer associated with any of a plurality of primary TAGs (PTAGs). In some embodiments, the performing the operation includes canceling all uplink transmissions except physical random access channel (PRACH) associated with all TAGS and maintain timing advance values of all TAGs in response to the expiration of the timer associated with a TAG having a specific TAG index. In some embodiments, the specific TAG index is zero or a specific TAG index value associated with the TAG which contains SPCell. In some embodiments, the timer includes a time alignment timer (TAT). In some embodiments, the at least one reference signal includes at least one downlink reference signal.

Figure 9:
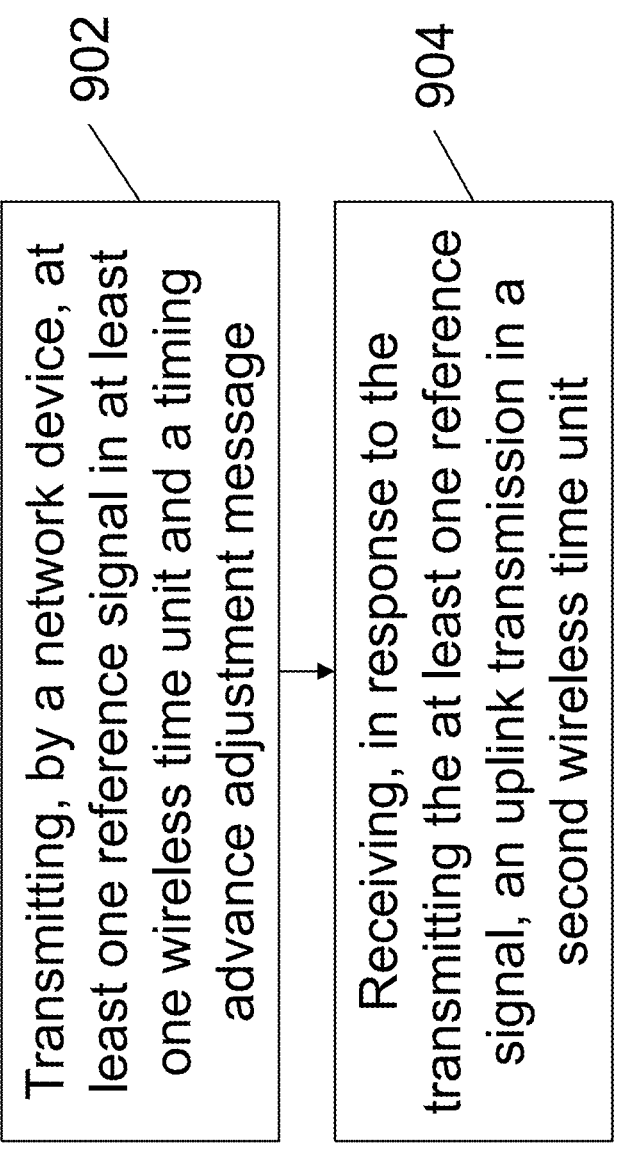
FIG. 9 shows an exemplary flowchart for receiving an uplink transmission.

FIG. 9 shows an exemplary flowchart for receiving an uplink transmission. Operation 902 includes transmitting, by a network device, at least one reference signal in at least one wireless time unit and a timing advance adjustment message, where the timing advance adjustment message indicates a timing advance related information. Operation 904 includes receiving, in response to the transmitting the at least one reference signal, an uplink transmission in a second wireless time unit, where a start time of the second wireless time unit is based on at least one timing value of the at least one wireless time unit and the timing advance related information.

In some embodiments, the second wireless time unit is advanced with a timing advance value indicated by the timing advance related information to obtain the start time of the second wireless time unit. In some embodiments, the timing advance adjustment message is associated with a transmission parameter that is same as that associated with the at least one reference signal. In some embodiments, the at least one timing value of the at least one wireless time unit is associated with the transmission parameter that is different from another transmission parameter of another timing value of another wireless time unit where the reference signal is received. In some embodiments, the transmission parameter comprises information grouping one or more reference signals, a reference signal resource set, a physical uplink control channel (PUCCH) resource set, panel related information, a sub-array, an antenna group, an antenna port group, a group of antenna ports, a beam group, a beam state, a candidate cell, a candidate cell list, a physical cell index (PCI), a time alignment group (TAG), TRP related information, a CORESET pool index, a set of power control parameters, an index of TCI state in a TCI state codepoint, a wireless communication device capability value, or a wireless communication device capability set.

In some embodiments, the at least one wireless time unit includes at least one wireless frame, and wherein the second wireless time unit includes a second wireless frame. In some embodiments, the method further comprises transmitting information indicative of a plurality of time alignment groups (TAGs) or a plurality of TAG indexes and a plurality of transmission parameters, and where the plurality of TAGs or the plurality of TAG indexes are associated with the plurality of transmission parameters based on an order in which the plurality of TAGs or the plurality of TAG indexes are indicated in the information. In some embodiments, the method further comprises transmitting information indicative of a plurality of time alignment groups (TAGs) or a plurality of TAG indexes and a plurality of transmission parameters, and where the plurality of TAGs or the plurality of TAG indexes are associated with the plurality of transmission parameters based on index values of the plurality of TAGs or the plurality of TAG indexes.

In some embodiments, a transmission of the uplink transmission is scheduled by the network device or configured for the communication device, the transmission of the uplink transmission is not associated with a transmission parameter, and an association between the transmission of the uplink transmission and the transmission parameter is based on a default rule or a message from the network device. In some embodiments, the start time for the transmission of the uplink transmission is based on (1) the timing advance related information, (2) the at least one reference signal, and/or (3) the at least one timing value that is associated with a default transmission parameter. In some embodiments, the default transmission parameter indicated by the message from the network device or determined by the default rule comprises any one or more of: a lowest CORESETPoolIndex value, a highest CORESETPoolIndex value, a time alignment group (TAG) with a lowest TAG ID or a highest TAG ID, a transmission configuration indicator (TCI) state associated with the lowest TAG-ID or the highest TAG-ID, a transmit-receive point (TRP) related indication with a lowest value or a highest value, a pre-configured value, and/or a specific physical cell ID (PCI).

In some embodiments, the method further comprises determining, by the network device, not to schedule a second uplink transmission associated with a second timing advance value within a time gap. In some embodiments, the time gap starts from an end of the uplink transmission associated with the first timing advance value or starts from an end of a wireless frame associated with the first timing advance value. In some embodiments, the time gap is determined based on any one or more of a predetermined value set, a predetermined table, a predetermined default rule, or a message including at least one of a number of symbols, an index of the predetermined value set or an index of an entry in the predetermined table. In some embodiments, the at least one reference signal includes at least one downlink reference signal.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
receiving, by a communication device, at least one reference signal in at least one wireless time unit and a timing advance adjustment message,
wherein the timing advance adjustment message indicates a timing advance related information, and
wherein the timing advance adjustment message is associated with a transmission parameter that is same as that associated with the at least one reference signal; and
transmitting, in response to the receiving the at least one reference signal, an uplink transmission in a second wireless time unit,
wherein a start time of the second wireless time unit is based on at least one timing value of the at least one wireless time unit and the timing advance related information.

2. The method of claim 1, wherein the start time of the second wireless time unit is obtained by advancing the second wireless time unit with a timing advance value determined by the timing advance related information.

3. The method of claim 1, wherein the at least one timing value of the at least one wireless time unit is associated with the transmission parameter that is different from another transmission parameter of another timing value of another wireless time unit where the reference signal is received.

4. The method of claim 1, wherein the communication device is configured with a plurality of time alignment groups (TAGs) or TAG indexes for a serving cell in an information element received by the communication device.

5. The method of claim 4, wherein the plurality of TAGs that are associated with a special cell (SpCell) are primary TAGs (PTAGs).

6. The method of claim 1,
wherein the communication device is capable of simultaneous uplink transmission operation,
wherein the simultaneous uplink transmission operation is enabled, allowed or indicated to the communication device, and
wherein the communication device is scheduled or configured to perform two uplink transmissions that are associated with different panel related information.

7. The method of claim 6, wherein the two uplink transmissions are performed without reducing transmission duration of the two uplink transmissions or without canceling the two uplink transmissions.

8. The method of claim 1, wherein when a time alignment timer (TAT) associated with any secondary timing advance groups (STAGs) expires, the communication device cancels all uplink transmissions associated with a TAG and maintains timing advance values of the TAG.

9. The method of claim 8, wherein the canceling the uplink transmissions comprises at least one of: flushing hybrid automatic repeat request (HARQ) buffers, releasing configured physical uplink control channel (PUCCH) or sounding reference signal (SRS), clearing configured downlink assignments, clearing configured uplink grants or clearing physical uplink shared channel (PUSCH) resource for semi-persistent channel state information (CSI) reporting.

10. A wireless communication method, comprising:
transmitting, by a network device, at least one reference signal in at least one wireless time unit and a timing advance adjustment message,
wherein the timing advance adjustment message indicates a timing advance related information,
wherein the timing advance adjustment message is associated with a transmission parameter that is same as that associated with the at least one reference signal; and
receiving, in response to the transmitting the at least one reference signal, an uplink transmission in a second wireless time unit,
wherein a start time of the second wireless time unit is based on at least one timing value of the at least one wireless time unit and the timing advance related information.

11. The method of claim 10, wherein the second wireless time unit is advanced with a timing advance value determined by the timing advance related information to obtain the start time of the second wireless time unit.

12. The method of claim 10, wherein the at least one timing value of the at least one wireless time unit is associated with the transmission parameter that is different from another transmission parameter of another timing value of another wireless time unit where the reference signal is received.

13. The method of claim 10, wherein the network device configures the communication device with a plurality of time alignment groups (TAGs) or TAG indexes for a serving cell in an information element transmitted to the communication device.

14. The method of claim 10, wherein the plurality of TAGs that are associated with a special cell (SpCell) are primary TAGs (PTAGs).

15. An apparatus for wireless communication comprising a processor, configured to implement a method, the processor configured to:
receive, by a communication device, at least one reference signal in at least one wireless time unit and a timing advance adjustment message,
wherein the timing advance adjustment message indicates a timing advance related information, and
wherein the timing advance adjustment message is associated with a transmission parameter that is same as that associated with the at least one reference signal; and
transmit, in response to the receive the at least one reference signal, an uplink transmission in a second wireless time unit,
wherein a start time of the second wireless time unit is based on at least one timing value of the at least one wireless time unit and the timing advance related information.

16. The apparatus of claim 15, wherein the start time of the second wireless time unit is obtained by advancing the second wireless time unit with a timing advance value determined by the timing advance related information.

17. The apparatus of claim 15, wherein the at least one timing value of the at least one wireless time unit is associated with the transmission parameter that is different from another transmission parameter of another timing value of another wireless time unit where the reference signal is received.

18. An apparatus for wireless communication comprising at least one processor, configured to cause the apparatus to:
transmit, by a network device, at least one reference signal in at least one wireless time unit and a timing advance adjustment message,
wherein the timing advance adjustment message indicates a timing advance related information,
wherein the timing advance adjustment message is associated with a transmission parameter that is same as that associated with the at least one reference signal; and
receive, in response to the transmit the at least one reference signal, an uplink transmission in a second wireless time unit,
wherein a start time of the second wireless time unit is based on at least one timing value of the at least one wireless time unit and the timing advance related information.

19. The apparatus of claim 18, wherein the second wireless time unit is advanced with a timing advance value determined by the timing advance related information to obtain the start time of the second wireless time unit.

20. The apparatus of claim 18, wherein the at least one timing value of the at least one wireless time unit is associated with the transmission parameter that is different from another transmission parameter of another timing value of another wireless time unit where the reference signal is received.

* * * * *